US009205411B2

United States Patent
Arndt et al.

(10) Patent No.: US 9,205,411 B2
(45) Date of Patent: Dec. 8, 2015

(54) COMPONENT HAVING A CATALYTIC SURFACE, METHOD FOR PRODUCING SAME, AND USE OF SAID COMPONENT

(75) Inventors: Axel Arndt, Berlin (DE); Christian Doye, Berlin (DE); Ursus Krüger, Berlin (DE); Uwe Pyritz, Berlin (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 18 days.

(21) Appl. No.: 13/699,400

(22) PCT Filed: May 16, 2011

(86) PCT No.: PCT/EP2011/057884
§ 371 (c)(1),
(2), (4) Date: Nov. 21, 2012

(87) PCT Pub. No.: WO2011/144568
PCT Pub. Date: Nov. 24, 2011

(65) Prior Publication Data
US 2013/0065752 A1    Mar. 14, 2013

(30) Foreign Application Priority Data

May 21, 2010  (DE) .......................... 10 2010 021 554

(51) Int. Cl.
*B01J 23/32* (2006.01)
*B01J 23/889* (2006.01)
(Continued)

(52) U.S. Cl.
CPC ......... *B01J 23/8892* (2013.01); *B01D 53/8675* (2013.01); *B01J 23/34* (2013.01); *B01J 37/0225* (2013.01); *C23C 24/04* (2013.01); *C23C 30/00* (2013.01); *B01D 2255/2073* (2013.01);
(Continued)

(58) Field of Classification Search
None
See application file for complete search history.

(56) References Cited

U.S. PATENT DOCUMENTS

| 3,701,822 A | 10/1972 | Negra et al. ................... 423/213 |
| 4,200,609 A | 4/1980  | Byrd ............................. 422/122 |

(Continued)

FOREIGN PATENT DOCUMENTS

| AU | 728032 B2 | 1/2001 | ............. B01D 15/00 |
| CN | 1228036 A | 9/1999 | ............. B01D 15/00 |

(Continued)

OTHER PUBLICATIONS

Jin et al., "γ-MnO2 octahedral molecular sieve: Preparation, characterization, and catalytic activity in the atmospheric oxidation of toluene", Applied Catalysis A: General 355 (2009) 169-175.*
(Continued)

*Primary Examiner* — Jennifer A Smith
*Assistant Examiner* — Anita Nassiri Motlagh
(74) *Attorney, Agent, or Firm* — Slayden Grubert Beard PLLC

(57) ABSTRACT

A component has a catalyst surface including metal regions and regions of MnO2 contacting the former, wherein the metal regions are made of Co and/or Sn and/or Zn (or alloys of said metals). Said material pairings achieve a significantly improved catalytic effect in comparison to the pure metals. Said surfaces can be used, for example, in room air purification for reducing ozone content. The surface can be applied, for example, by coating the component, wherein the metal region and the region of MnO2 are applied in two layers.

6 Claims, 2 Drawing Sheets

(51) Int. Cl.

| | |
|---|---|
| *B01D 53/86* | (2006.01) |
| *B01J 23/34* | (2006.01) |
| *B01J 37/02* | (2006.01) |
| *C23C 24/04* | (2006.01) |
| *C23C 30/00* | (2006.01) |

(52) U.S. Cl.
CPC ............... B01D2255/2094 (2013.01); B01D 2255/20746 (2013.01); B01D 2255/20792 (2013.01)

(56) References Cited

U.S. PATENT DOCUMENTS

| | | | | |
|---|---|---|---|---|
| 4,302,490 | A | 11/1981 | Byrd | 427/301 |
| 4,892,637 | A * | 1/1990 | Sauer et al. | 204/291 |
| 5,011,752 | A | 4/1991 | Kordesch et al. | 429/206 |
| 6,281,159 | B1 | 8/2001 | Fromson et al. | 502/324 |
| 6,338,830 | B1 | 1/2002 | Moskovitz et al. | 423/210 |
| 6,685,898 | B2 * | 2/2004 | Allen et al. | 423/213.2 |
| 7,037,596 | B1 | 5/2006 | Benthien et al. | 428/632 |
| 2003/0050188 | A1 * | 3/2003 | Ovshinsky et al. | 502/300 |
| 2003/0228414 | A1 | 12/2003 | Smith et al. | 427/180 |
| 2004/0067176 | A1 | 4/2004 | Pfeifer et al. | 422/177 |
| 2006/0182669 | A1 * | 8/2006 | Matumura et al. | 422/177 |
| 2007/0210010 | A1 | 9/2007 | Miyake et al. | 210/762 |
| 2008/0112870 | A1 | 5/2008 | Moini et al. | 423/237 |
| 2008/0193354 | A1 | 8/2008 | Chen et al. | 423/247 |
| 2008/0237036 | A1 | 10/2008 | Barker et al. | 204/290.13 |
| 2009/0035703 | A1 * | 2/2009 | Mennig et al. | 430/302 |
| 2011/0293495 | A1 | 12/2011 | Arndt et al. | 423/219 |

FOREIGN PATENT DOCUMENTS

| | | | | |
|---|---|---|---|---|
| CN | 101259438 A | 9/2008 | ............ | B01D 53/94 |
| DE | 19915377 A1 | 10/2000 | ................ | A61L 9/00 |
| DE | 102005023871 A1 | 11/2006 | ................ | B41C 1/10 |
| DE | 102008059165 A1 | 5/2010 | ............ | B01D 53/86 |
| EP | 0369163 A1 | 5/1990 | ............ | B01D 53/94 |
| EP | 0399302 A2 | 11/1990 | ............ | B01D 53/86 |
| EP | 1355048 A1 | 10/2003 | ............ | B01D 39/14 |
| JP | 2013078743 A | 5/2013 | ................ | B01J 23/78 |
| WO | 2004/029327 A1 | 4/2004 | ............ | C23C 18/18 |
| WO | 2011/144568 A1 | 11/2011 | ............ | B01D 53/66 |
| WO | 2011/144598 A1 | 11/2011 | ............ | B01D 53/66 |

OTHER PUBLICATIONS

International Search Report and Written Opinion, Application No. PCT/EP2011/057949, 21 pages, Aug. 16, 2011.
Schmachtel, Rinke et al., "New Oxygen Evolution Anodes for Metal Electrowinning: $MnO_2$ Composite Electrodes," Journal of Applied Electrochemistry, vol. 39, No. 10, 14 pages, May 6, 2009.
International Search Report and Written Opinion, Application No. PCT/EP2011/057884, 21 pages, Aug. 16, 2011.
Chinese Office Action, Application No. 201180025226.1, 15 pages, Feb. 21, 2014.
Jie, Wu et al., "Developments in Cold Gas Dynamic Spray Technology," Institute of Metal Research, The Chinese Academy of Sciences, 4 pages (Chinese language w/ English abstract), Jan. 31, 2003.
Chinese Office Action, Application No. 201180025167.8, 15 pages, Apr. 14, 2014.

* cited by examiner

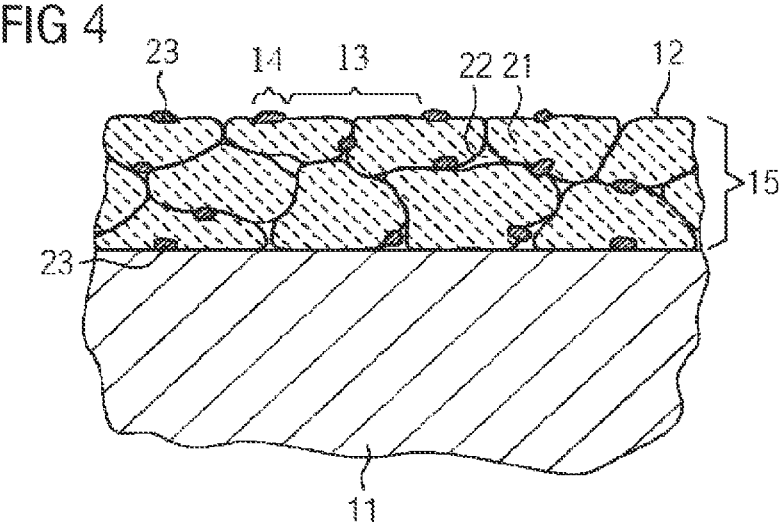
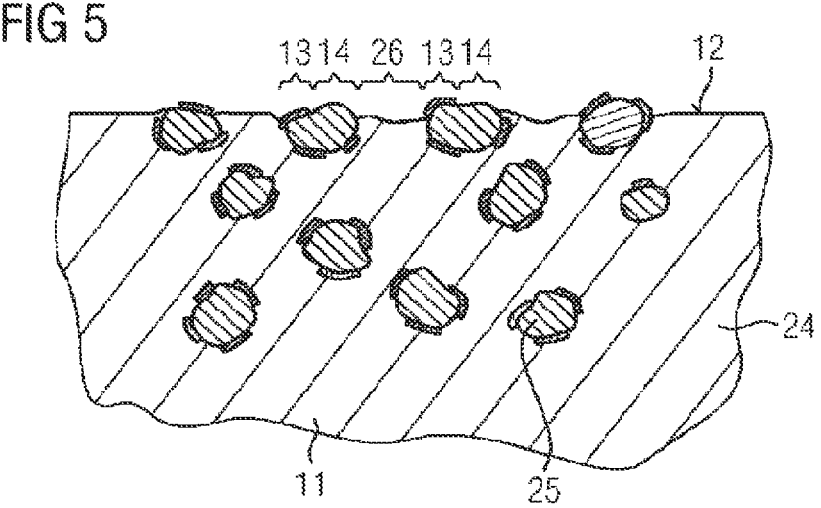

COMPONENT HAVING A CATALYTIC SURFACE, METHOD FOR PRODUCING SAME, AND USE OF SAID COMPONENT

CROSS-REFERENCE TO RELATED APPLICATIONS

This application is a U.S. National Stage application of International Application No. PCT/EP2011/057884 filed May 16, 2011, which designates the United States of America, and claims priority to DE Patent Application No. 10 2010 021 554.6 filed May 21, 2010. The contents of which are hereby incorporated by reference in their entirety.

TECHNICAL FIELD

The disclosure relates to a component part having a catalyst surface. The disclosure also relates to a process for producing a catalyst surface on a component part by cold gas spraying. The disclosure finally relates to use of such a component part.

BACKGROUND

A catalyst surface on a component part is known, for example, according to US 2003/0228414 A1. This catalyst surface can be obtained on the component part by direct deposition of a catalytically active substance. For this purpose, cold gas spraying is used, in which the particles of the catalytic laminate material are fed into what is called a cold gas jet, a process gas flowing at supersonic velocity. In the cold gas jet, these particles are accelerated toward the surface of the component part to be coated and remain adhering on this surface with conversion of the kinetic energy thereof.

SUMMARY

In one embodiment, a component part comprises: a catalyst surface comprising metallic regions of Co or Sn or Zn or alloys of at least one of these metals, and regions of $MnO_2$ in contact with the metallic regions, wherein the regions of $MnO_2$ comprise nanoparticles having a diameter greater than 100 nm. In a further embodiment, the manganese oxide comprises the γ polymorph of $MnO_2$. In a further embodiment, the structural proportion of the manganese oxide present in the γ polymorph is more than 50% by weight. In a further embodiment, the surface area proportion of the regions of $MnO_2$ in relation to the sum of the metallic regions of Co or Sn or Zn or alloys of at least one of these metals is between 30 and 60%. In a further embodiment, the component part comprises a metallic material which provides the metallic region of Co or Sn or Zn or alloys of at least one of these metals, and an only partly covering layer of $MnO_2$ has been applied to this component part. In a further embodiment, the component part comprises a ceramic which provides the region of $MnO_2$, and wherein a partial covering layer of Co or Sn or Zn or alloys of at least one of these metals is applied to the component part. In a further embodiment, the component part comprises a coating which provides the metallic regions of Co or Sn or Zn or alloys of at least one of these metals and the regions of $MnO_2$ on the catalyst surface. In a further embodiment, the coating has a metallic layer of Co or Sn or Zn or alloys of at least one of these metals, on which a partial covering layer of $MnO_2$ is applied. In a further embodiment, the coating has a ceramic layer which provides the region of $MnO_2$, on which a partial metallic layer of Co or Sn or Zn or alloys of at least one of these metals is applied. In a further embodiment, the coating comprises a ceramic which provides the region of $MnO_2$, into which metallic particles of Co or Sn or Zn or alloys of at least one of these metals have been embedded. In a further embodiment, the coating comprises a metallic matrix composed of Co or Sn or Zn or alloys of at least one of these metals, into which particles of $MnO_2$ are embedded. In a further embodiment, the component or a layer applied thereto comprises a material other than the metallic region and $MnO_2$, and particles present therein and/or thereon each provide the metallic regions of Co or Sn or Zn or alloys of at least one of these metals and the regions of $MnO_2$ on the surface thereof. In a further embodiment, the component part has a grid structure. In a further embodiment, the component part is configured as an outlet grid of an extractor hood or of a flow-through plasma generator.

In another embodiment, a process is provided for producing a catalyst surface on a component part by cold gas spraying, comprising: spraying of $MnO_2$ particles to form partial regions of the catalyst surface, and providing metallic regions of Co or Sn or Zn or alloys of at least one of these metals on the catalyst surface, the metallic regions adjoining the regions of $MnO_2$, wherein the $MnO_2$ particles comprise nanoparticles having a diameter of greater than 100 nm. In a further embodiment, the $MnO_2$ particles comprise the γ polymorph of $MnO_2$, and the cold gas spraying is conducted with operating temperatures below a decomposition temperature of manganese oxide. In a further embodiment, a mixture of $MnO_2$ particles and metallic particles of Co or Sn or Zn or alloys of at least one of these metals is used for the metallic regions of the catalyst surface. In a further embodiment, the specific surface area which forms the catalyst surface of the layer produced is controlled by the energy input into the cold gas jet.

BRIEF DESCRIPTION OF THE DRAWINGS

Example embodiments will be explained in more detail below with reference to figures, in which:

FIGS. 1 to 5 illustrate different working examples of the component part with various catalytic surfaces, according to various example embodiments.

DETAILED DESCRIPTION

Figure 1:
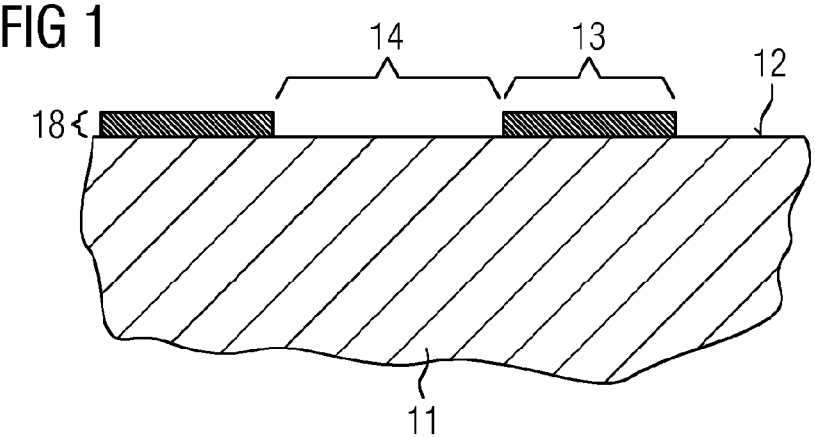

Some embodiments provide a component part having a catalyst surface, a process for production thereof and use of said component, wherein the catalyst surface should have a comparatively high catalytic activity.

Embodiments provide such a component part and a cold spraying process, wherein the catalyst surface comprises metallic regions and regions of $MnO_2$ in contact with the latter. The regions of $MnO_2$ constitute the ceramic proportion of the catalyst surface and are also referred to hereinafter in this context as ceramic regions. In addition, in accordance with the invention, the metallic regions comprise Co or Sn or Zn or alloys of at least one of these metals. Alloys of these metals are understood to mean all alloys which comprise Co and/or Sn and/or Zn as alloy constituents, the total proportion of these metals (irrespective of whether one, two or three of these metals is or are present in the alloy) being more than 50% by weight. Further alloy constituents, for example other metals, may thus be represented with a proportion of less than 50% by weight. When the abbreviated form of Co and/or Sn and/or Zn is discussed below or metallic regions or a metallic matrix are referred to in general terms in connection with the metal/ceramic surface pair, what is always meant is a material composed of Co or Sn or Zn or alloys of at least one of these metals, as described above.

In order to produce the layer, the cold gas spraying should produce the catalyst surface by spraying of $MnO_2$ particles, the $MnO_2$ forming only regions of the catalyst surface and also providing metallic regions of the catalyst surface each adjoining the regions of $MnO_2$. The metallic regions may, as will be explained in detail hereinafter, be provided by the metallic surface of the component part to be coated, or by addition of metallic particles to the cold gas jet. If the above-specified alloys are to be obtained, this can be accomplished either by use of powders of the desired alloy, or particles of different composition are mixed with one another in order to arrive at the desired alloy composition, for example particles of pure Co and/or Sn and/or Zn. The latter process is also referred to as mechanical alloying.

The use of $MnO_2$ as a pair with one of the metals mentioned makes it possible to achieve a particularly high catalytic activity of the catalyst surface formed. It has been found that, surprisingly, the catalytic activity of $MnO_2$, which is known per se, can be increased by the metallic regions at the surface, even though the catalytic surface area of $MnO_2$ available is reduced overall. This is contrary to the result to be expected, in that a reduction in the real surface area of $MnO_2$ available, in the case of incomplete coverage of the surface of the component part, should be associated with a proportional loss of catalyst activity.

It is thus advantageously possible to produce component parts with comparatively efficient catalyst surfaces, by covering regions of the catalyst surface with a metal rather than with $MnO_2$. The surface of the component part must thus not be covered completely with the metallic regions and the regions of $MnO_2$. Merely a partial coating is adequate to achieve the catalytic action. Depending on the application, the size selected should be such that the catalytic surface area available is sufficient for the desired effect for conversion, for example, of ozone. The region of $MnO_2$ in relation to the total area formed by the two regions should be at least 10%, e.g., 30 to 70%, e.g., 50%.

In one configuration, the $MnO_2$ is present at least partly in the $\gamma$ polymorph. The $\gamma$ polymorph is a structure of the crystal formed by $MnO_2$ which advantageously features particularly strong catalytic action. However, the real structure of $MnO_2$ is generally not present exclusively in the $\gamma$ polymorph, but partly also in other polymorphs (for example the $\beta$ polymorph of $MnO_2$). However, in a particular configuration, the structure proportion of $MnO_2$ in the $\gamma$ polymorph should be more than 50% by weight.

In another configuration, the component part comprises the metal which provides the metallic region, and an only partly covering layer of $MnO_2$ has been applied to this component part. This component part comprises, for example, component parts made from Co and/or Sn and/or Zn, which already provide one constituent required for the production of the catalytic surface on the basis of their material composition. On these component parts, production of the surface is advantageously possible in a particularly simple manner by applying a non-covering layer which provides the other region of the surface, namely $MnO_2$.

Conversely, it is also conceivable that the component part comprises a ceramic which provides the region of $MnO_2$, and an only partly covering layer of the metal has been applied on this component part. For example, the component part could be designed as a wear-stressed ceramic component part. This also need not consist exclusively of $MnO_2$. For example, it is conceivable that the ceramic is produced as a sintered ceramic from different kinds of particles, in which case the $MnO_2$ constitutes one kind of these particles. In this variant, however, it should be noted that the processing temperatures for the component part must be below 535° C., since the $MnO_2$ is converted at this temperature to MnO, and thus loses its excellent catalytic properties in the material pair.

In another configuration, the component part has a coating which provides the metallic regions and the regions of $MnO_2$ on the surface. In this variant, it is possible to coat components of various materials, the catalytic properties of the layer advantageously being caused solely by the nature of the layer or the catalytic surface area formed thereby. In this context, it is necessary in each case to select a suitable coating process for the component part material in question.

Particularly advantageously, the component part may have a grid structure. This may be a grid with a two-dimensional arrangement, i.e. an essentially flat component part. It is also possible to form three-dimensional grid structures which can be produced, for example, by means of rapid prototyping technologies. The grid structures offer the advantage that, on the one hand, the surface area available for the application of the catalytic active partners is increased, but, on the other hand, the flow resistance generated by the grid structure is comparatively minor. Grid component parts can therefore advantageously be used in ventilation ducts. An example of a particularly advantageous use is that in extractor hoods, in which case the grid structure forms the outlet grid thereof for cleaned waste air. This application is used in what are called recirculating air hoods, in which, in contrast to vented air hoods, the air sucked in is not removed from the building but remains therein.

In order to achieve, in extractor hoods working by the air recirculation principle, not only freeing of the air from solids, aerosols and ultrasmall particles, as present, for example, in cooking vapor, but also freeing from odors, the prior art uses plasma generators having a high-voltage discharge source with which the air is enriched with atomic oxygen. The latter brings about a decomposition or oxidation process which fragments the carbon compounds responsible for the odors which arise and eliminates the odors in this way. However, this process also gives rise to ozone, which can be converted to diatomic oxygen by a catalytic route by the component parts. This advantageously makes it possible to dispense with activated carbon filters, which disadvantageously offer comparatively high air resistance to the air flow in the extractor hood and also have to be changed at regular intervals.

The process used for production of the layer on the component part may, for example, be cold gas spraying, in which case the catalytic surface is obtained by spraying $MnO_2$ particles. In this case, the $MnO_2$ forms only regions of the catalytic surface; the metallic regions are formed from Co or Sn or Zn or alloys of at least one of these metals. The metallic regions may, as already described, either be provided by the component itself, or they are added as particles to the cold gas jet, such that the metallic regions of the surface are also formed by the layer which forms.

More particularly, it is also possible to use $MnO_2$ particles which at least partly have the $\gamma$ polymorph of the $MnO_2$ structure. In this case, the cold gas spraying always has to be conducted with operating temperatures below the decomposition temperature of the $\gamma$ polymorph. This temperature is 535° C. For process technology purposes, in the selection of the temperature of the cold gas jet, a certain safety margin from this decomposition temperature may be observed. On the other hand, it has been found that briefly exceeding this temperature when the $MnO_2$ particles hit the surface has no effects in terms of structure, because this temperature increase occurs extremely locally only in the surface region of the processed $MnO_2$ particles. The respective core of the particles, which remains within an uncritical temperature range, is apparently able to sufficiently stabilize the γ polymorph of the particle structure, such that the γ polymorph of the $MnO_2$ structure is also preserved at the catalytically active surface of the particles.

Moreover, heating of the $MnO_2$ above 450° C. leads in principle to a conversion of the $MnO_2$ to $Mn_2O_3$. This process, however, proceeds only gradually, and so brief exceedance of the temperature, as occurs in the cold gas spraying, is not harmful.

In order to preserve the excellent catalytic properties of the $MnO_2$, the γ polymorph of the structure must be at least partly present in the $MnO_2$ particles. This can be implemented through a mixture of the $MnO_2$ particles with manganese oxide particles of other polymorphs (e.g. β polymorph of $MnO_2$).

Another option is that the particles comprise phase mixtures, such that the γ polymorph of $MnO_2$ is not the only one present in the particles.

It is also advantageous when the $MnO_2$ particles processed are nanoparticles having a diameter of >100 nm. Nanoparticles in the context of this disclosure are understood to mean particles of diameter <1 μm. This is because it has been found that, surprisingly, such small particles of $MnO_2$ can be deposited with a high deposition efficiency on the catalytic surface. Normally, it is assumed, in contrast, that particles of less than 5 μm cannot be deposited by cold gas spraying, since, due to the low mass of these particles, the kinetic energy imparted by the cold gas jet is insufficient for deposition. It is not possible to explain why this is not the case specifically for $MnO_2$ particles. It appears that, as well as the effect of kinetic deformation, other adhesion mechanisms are also involved in the layer formation process.

The processing of nanoparticles of $MnO_2$ has the advantage that a comparatively high specific surface area and hence a strong catalytic effect can be achieved with comparatively little material. The boundaries between the regions of $MnO_2$ and metallic regions of the catalytic surface are also advantageously greatly prolonged in this way, which likewise causes a high level of catalytic properties.

It is advantageous when a mixture of $MnO_2$ particles and metallic particles of Co or Sn or Zn or alloys of at least one of these metals is used for the metallic regions of the catalytic surface. More particularly, in that case, through suitable selection of temperature and particle velocity in the cold gas jet, it is possible to control the energy input into the particles such that the specific (or internal) surface area which forms the catalytic surface in the layer produced is controlled. Thus, a higher porosity of the layer produced can increase the internal surface area in order to provide an increased catalytic surface area. This allows the germicidal action to be increased. In contrast, it may also be advantageous when the surface is very smooth, in order to counteract any soiling tendency.

As well as deposition by cold gas spraying, other production methods are of course also conceivable. For example, the catalytic surface can be produced electrochemically. In this case, the metallic region of the catalytic surface is deposited electrochemically as a layer from an electrolyte in which particles of $MnO_2$ are suspended. These are then incorporated into the layer which forms during the electrochemical deposition process, and hence also form a proportion of $MnO_2$ at the layer surface.

A further process can be obtained by producing the layer from a ceramic at least comprising $MnO_2$. For this purpose, a mixture of preceramic polymers which form precursors of the desired ceramic, and metal particles, can be applied in a solution to the component part to be coated. First of all, the solvent is vaporized, then a heat treatment which is advantageously below the decomposition temperature of the γ polymorph of $MnO_2$ (535° C.) results in conversion to the ceramic. Even better, the temperature remains below 450° C. in order to prevent the formation of $Mn_2O_3$.

The processes mentioned can also produce, inter alia, the configurations of the component part which follow. For instance, the coating produced may have a metallic layer on which an only partly covering layer of $MnO_2$ has been applied. The metallic layer thus forms the metallic region of the surface which appears at the sites with no coverage by the layer of $MnO_2$. In this component part configuration, advantageously, only a very small region of $MnO_2$ is needed. It is also conceivable in this case to employ the manufacturing processes detailed above in combination. For example, it is possible to produce the metallic layer by electroplating, and the only partly covering layer of $MnO_2$ by cold gas spraying.

Another option is for the coating to have a ceramic layer providing the region of $MnO_2$, on which an only partly covering metallic layer has been applied. This configuration of the component part is of significance when the properties of the ceramic layer, for construction reasons, are advantageous for the component part (for example corrosion protection).

It is also possible that the coating comprises a ceramic which provides the region of $MnO_2$, into which metallic particles are embedded. This is advantageous especially when the ceramic layer is subject to wear and the catalytic properties thereof are to be maintained with advancing wear, i.e. removal of the layer. The latter is ensured by virtue of the removal of the ceramic layer always exposing $MnO_2$ particles, which ensure the disclosed region of $MnO_2$ on the surface. Of course, it is also conceivable that the layer has a metallic matrix into which the particles of $MnO_2$ are embedded. For this layer too, the argument applies that, in the case of layer removal, the catalytic properties thereof are preserved.

The configuration of the component part may also be such that it or a layer applied thereto comprises a material other than the metallic region and $MnO_2$ and particles present therein (in the case of wear, see above) and/or thereon each provide the metallic regions and the regions of $MnO_2$ at the surface thereof (what is meant is the surface of the particles). These are advantageously tailored particles with catalytic properties which can be used universally on any surface or in any matrix. It is necessary here in each case to select the process suitable for introduction or application. With this measure, it is possible, for example, also to produce component parts composed of polymer with catalytic properties. The particles introduced into the layer or the component part are either exposed in the course of wear or, in the case of a porous structure of the component part, may also be involved in the catalytic action when they form the walls of the pores.

Finally, the disclosure relates to a use of the component part already described for reduction of the ozone content of a gas which passes over the catalyst surface. This gas may be provided primarily by the earth's atmosphere. Under particular conditions, the air is enriched with ozone, for example on hot summer days in city centers or else in higher atmospheric layers which are utilized by aviation. Since ozone is harmful to the health of the human organism, breathable air which is pumped from the atmosphere into the interior of motor vehicles or else into the passenger cabin of an aircraft can be substantially freed of ozone by means of the disclosed catalyst surface. In addition, the ozone content is elevated, for example, in the waste air region of extractor hoods with what are called plasma cleaning units for the waste air. It will be appreciated that applications in chemical process technology are also conceivable.

The catalyst surface can be configured, for example, as an inner lining of air-conducting conduit systems. This has the advantage that, by virtue of provision of the catalyst surface, no additional flow barrier need be incorporated into the air-conducting ducts. In order to increase the catalyst surface area available, the air conduit system may also be provided with an air-pervious insert around which the air sucked in must flow.

FIGS. 1 to 5 each show a component part 11 with a surface 12 having catalytic properties. These properties are obtained by providing the surface in each case having a region 13 comprising $MnO_2$, and also a metallic region 14 of Co and/or Sn and/or Zn. The component part could be, for example, an air-conducting duct, the inner walls of which form said surface.

However, the structure of the component parts 11, each of which is shown in section, has differences. The component part according to FIG. 1 itself comprises Co and/or Sn and/or Zn, such that the surface 12 thereof automatically provides the metallic region 14. Also formed on the surface 12 are island-like regions of $MnO_2$ which provide the region 13. These can be applied, for example, as a non-covering coating by cold gas spraying.

Figure 2:
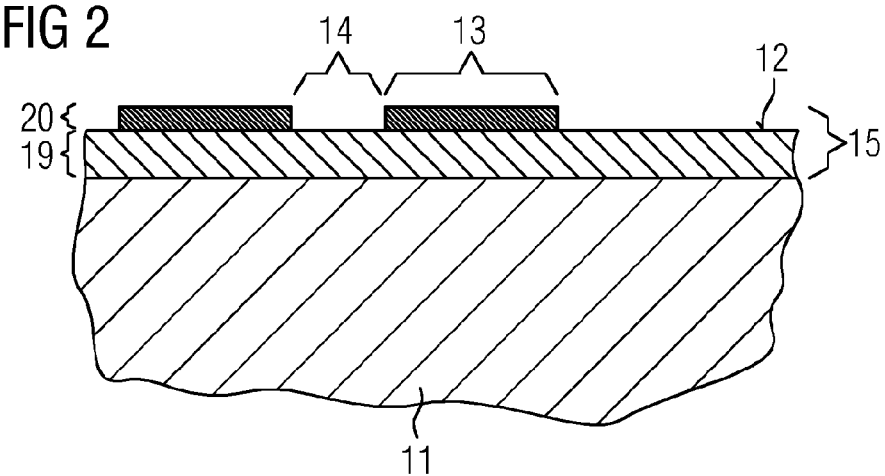

FIG. 2 shows a component part 11 which comprises a material unsuitable for production of the catalytic properties of the surface. Therefore, a metallic layer 15 of Co and/or Sn and/or Zn is applied to this component part 11. $MnO_2$ is applied to this layer, which provides the region 14, in the manner described for FIG. 1, such that regions 13 of the surface 12 are also formed.

Figure 3:
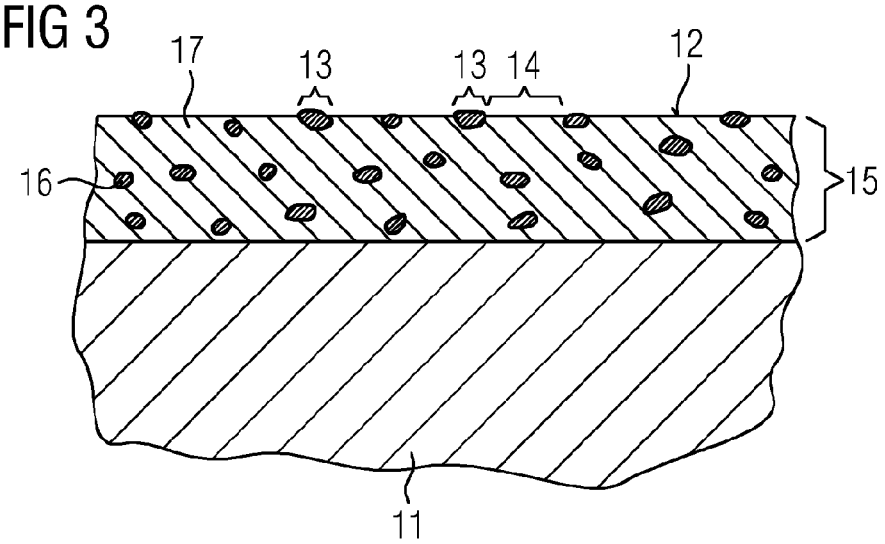

FIG. 3 shows that the metallic layer can also be doped with particles 16 of $MnO_2$, i.e. these particles are within the metallic matrix 17 of the metallic layer 15. In this respect, they also form that part of the surface 12 which provides the region 13. The rest of the surface forms the region 14.

In FIG. 4, the coating 15 is formed by a ceramic matrix 21, this having pores 22 which increase the inner surface area compared to the outer surface area 12 of the component part and thus also enhance any catalytic effect.

Provided in the ceramic matrix 21 are metallic particles 23 which both provide the region 14 at the surface 12 and can be catalytically active in the pores. As also in FIG. 2 and FIG. 3, the component part 11 according to FIG. 4 may comprise any material, it being necessary merely to ensure the adhesion of the coating 15 on the component part 11.

The component part 11 according to FIG. 5 has a matrix of any desired material 24, for example polymer. Introduced into this material are particles 25, the respective surfaces of which have both metallic regions of Co and/or Sn and/or Zn and regions of $MnO_2$. In the working example according to FIG. 5, the particles themselves comprise the metal, and the ceramic regions are formed on the surface of the particles. Of course, the reverse case is also conceivable. The particles are partly exposed at the surface 12 of the component part 11, as a result of which the metallic regions 14 and the regions 13 of $MnO_2$ 13 are formed. In addition, there are regions 26 of polymer on the surface 12, these being catalytically inactive. The ratio of said regions can be influenced directly by the filling level of particles 25 in the material 24.

What is claimed is:

1. A component part comprising:
   a catalyst surface comprising:
      metallic surface regions of Co or Sn or Zn or alloys of at least one of these metals, and
      surface regions of $MnO_2$ in contact with the metallic surface regions,
      wherein the surface regions of $MnO_2$ define a plurality of islands of $MnO_2$ physically separated and spaced apart from each other at the catalyst surface by the metallic surface regions such that only a portion of the catalyst surface includes $MnO_2$, and
      wherein the surface regions of $MnO_2$ surrounded by the metallic surface regions comprise nanoparticles having a diameter between 100 nm and 1 µm.

2. The component part of claim 1, wherein the manganese oxide comprises the γ polymorph of $MnO_2$.

3. The component part of claim 2, wherein the structural proportion of the manganese oxide present in the γ polymorph is more than 50% by weight.

4. The component part of claim 1, wherein the surface area proportion of the surface regions of $MnO_2$ in relation to the sum of the metallic surface regions of Co or Sn or Zn or alloys of at least one of these metals is between 30 and 60%.

5. The component part of claim 1, wherein the component part has a grid structure.

6. The component part of claim 5, wherein the component part is configured as an outlet grid of an extractor hood or of a flow-through plasma generator.

* * * * *